Figure 1:
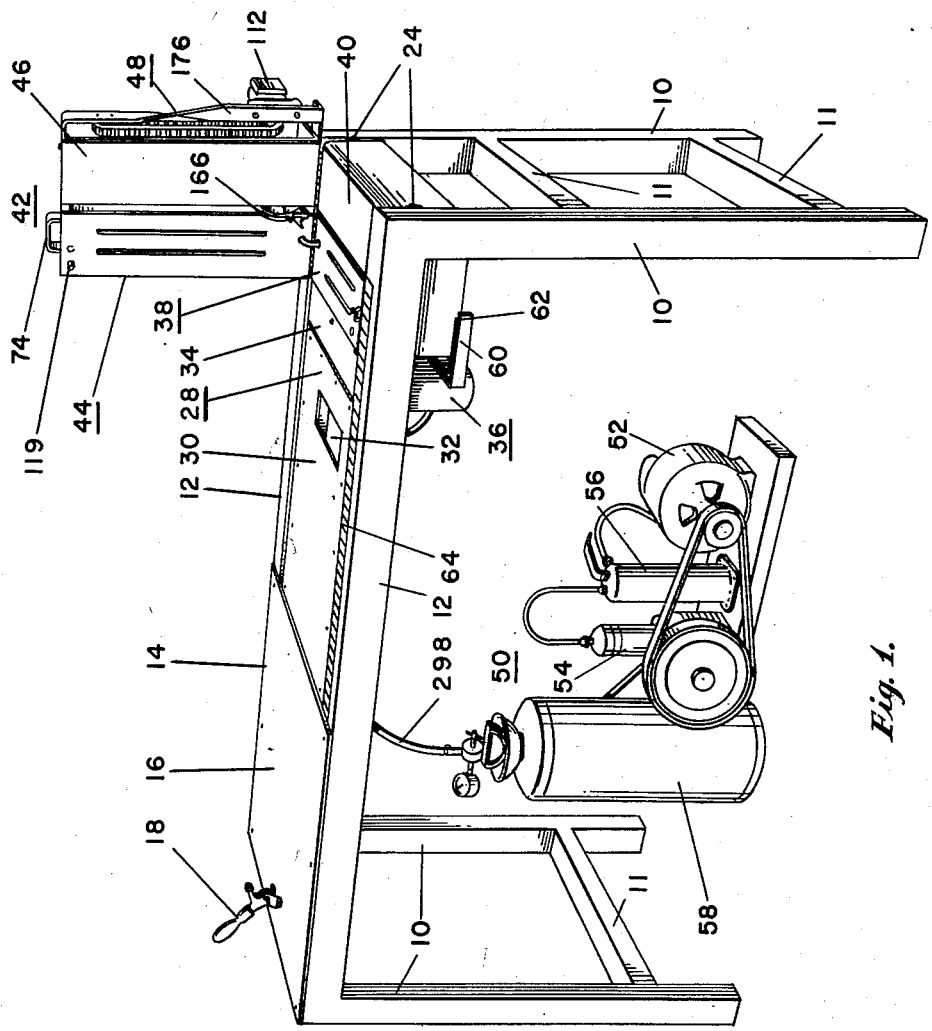

Nov. 16, 1954

L. T. CENTANNI 2,694,257

TROUSER PROCESSING MACHINE

Filed March 19, 1952

10 Sheets-Sheet 1

INVENTOR.
LOUIS T. CENTANNI
BY
*Caesar and Rivise*
ATTORNEYS.

INVENTOR.
LOUIS T. CENTANNI
BY
Caesar and Rivise
ATTORNEYS

Nov. 16, 1954      L. T. CENTANNI      2,694,257

TROUSER PROCESSING MACHINE

Filed March 19, 1952      10 Sheets-Sheet 4

INVENTOR.
LOUIS T. CENTANNI
BY
*Caesar and Rivise*
ATTORNEYS.

Nov. 16, 1954 L. T. CENTANNI 2,694,257
TROUSER PROCESSING MACHINE
Filed March 19, 1952 10 Sheets-Sheet 5
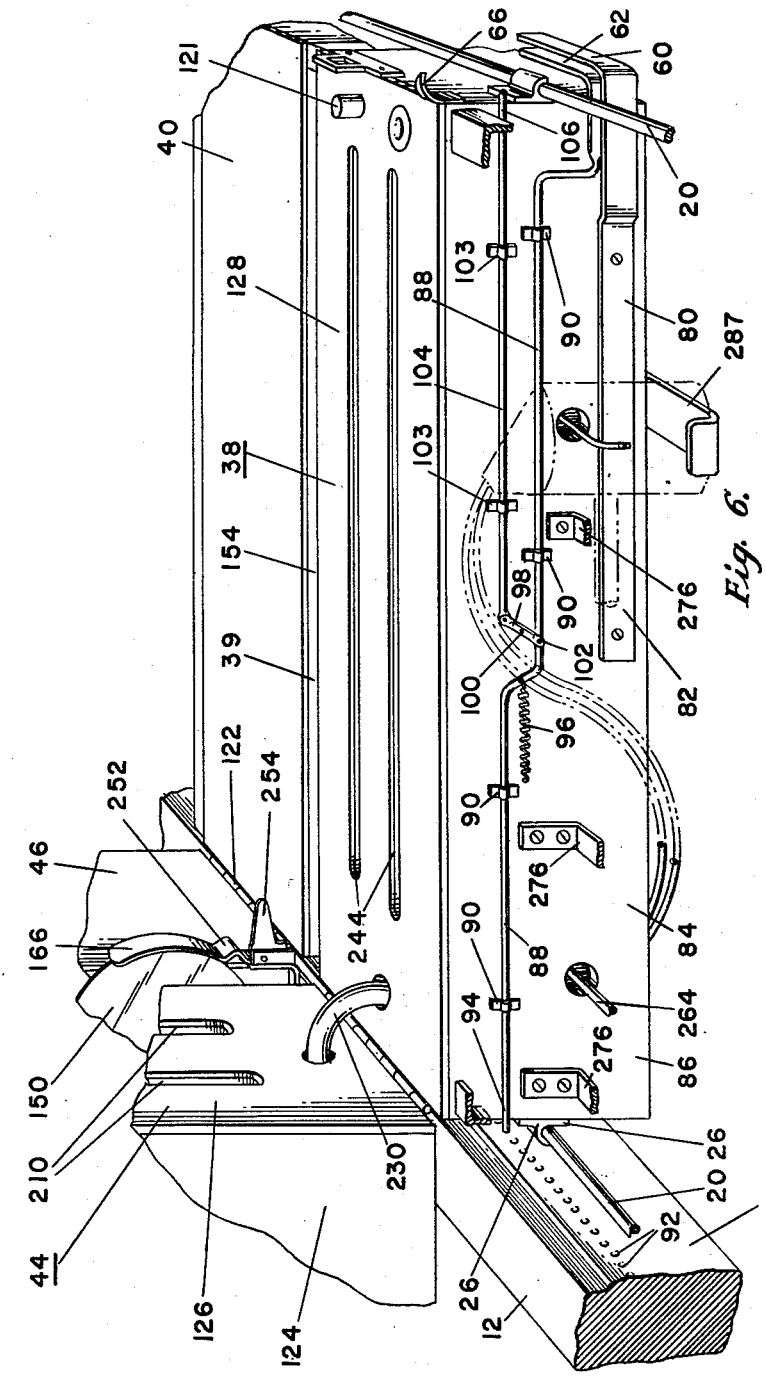
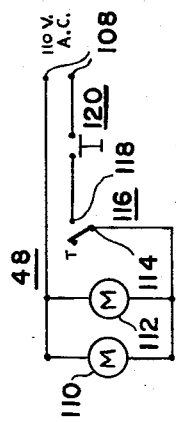
INVENTOR.
LOUIS T. CENTANNI
BY
*Caesar and Rivise*
ATTORNEYS.

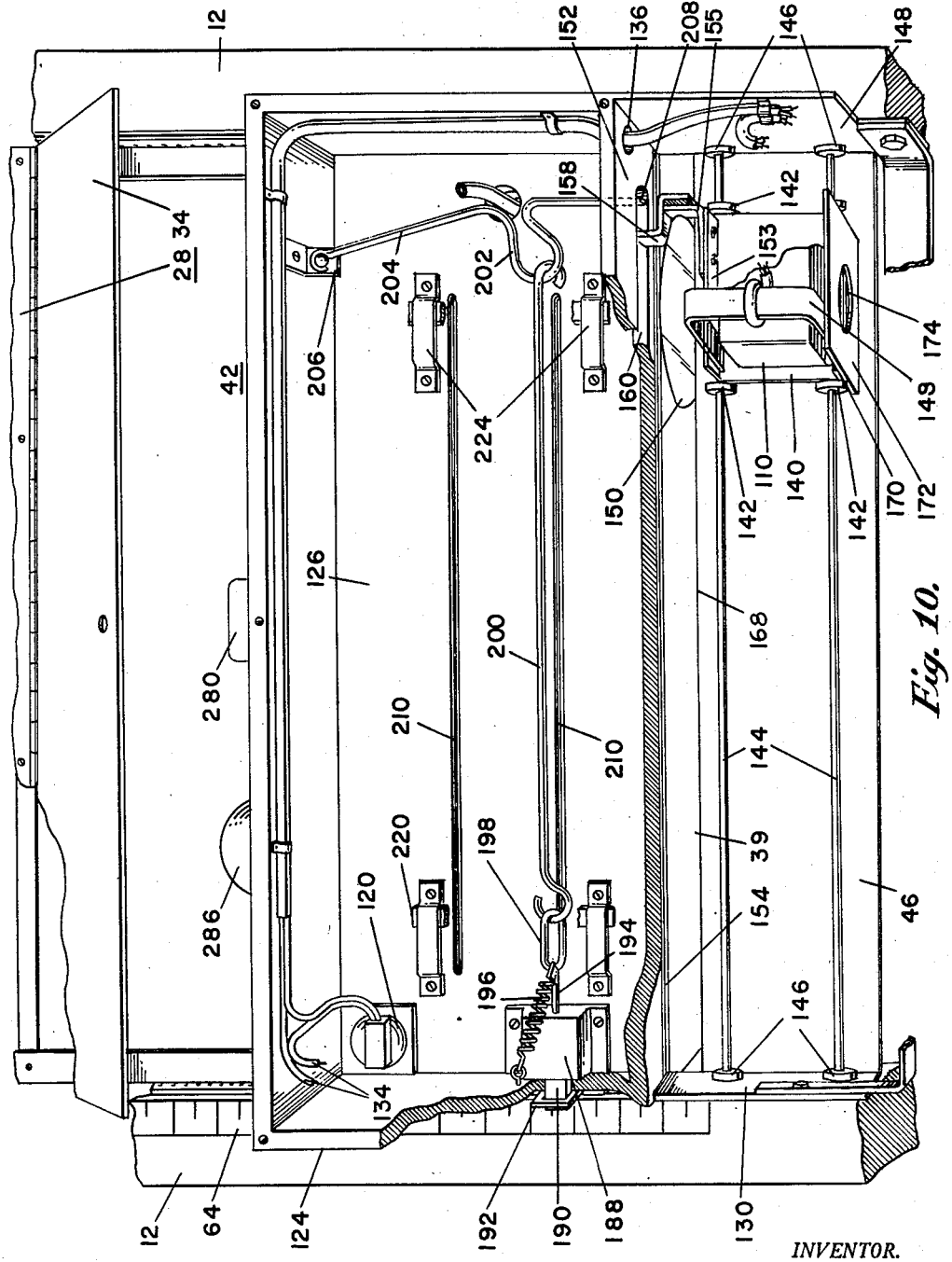

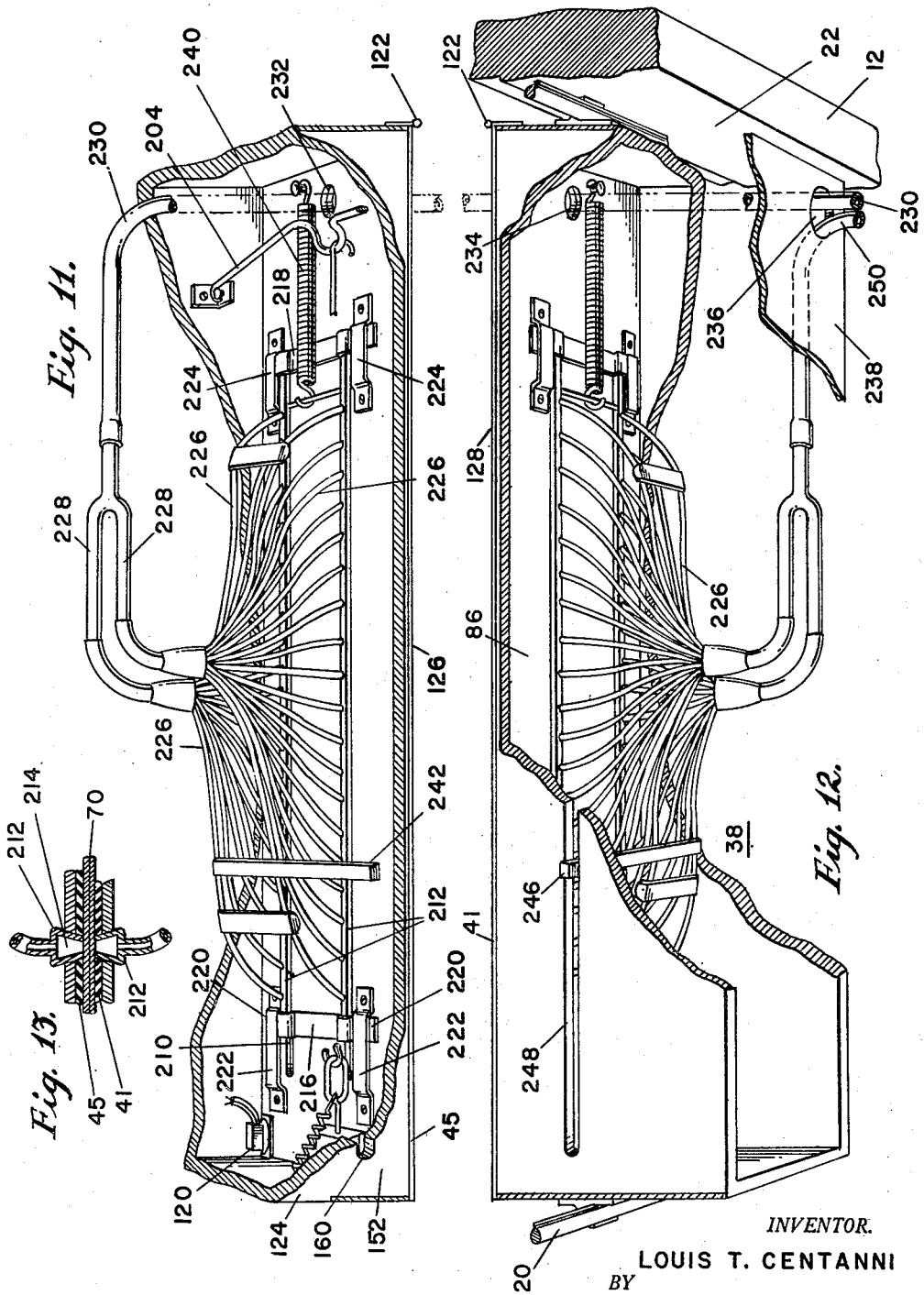

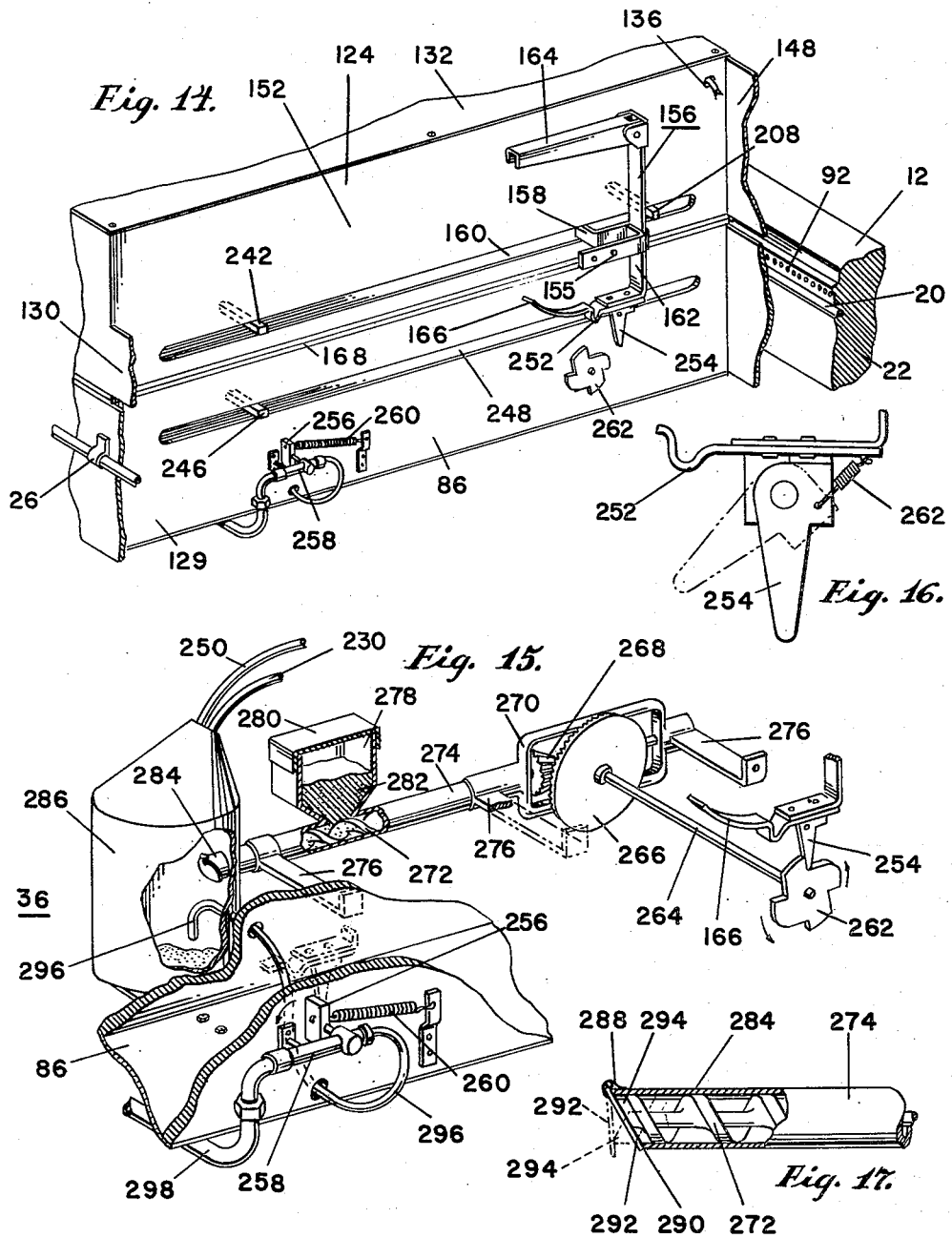

United States Patent Office 2,694,257
Patented Nov. 16, 1954

2,694,257

TROUSER PROCESSING MACHINE

Louis Thomas Centanni, Milbourne, Pa.; Elizabeth Centanni, administratrix of said Louis Thomas Centanni, deceased, assignor of one-half to Harry Levenson, Philadelphia, Pa.

Application March 19, 1952, Serial No. 277,510

16 Claims. (Cl. 33—2)

This invention relates to a trouser processing machine and more particularly to a machine for measuring, marking and cutting the legs of trousers.

Heretofore measuring, marking and cutting of trouser legs preparatory to forming cuffs thereon were mainly carried out by separately performed sequential hand operations. Such operations are highly time consuming and are subject to all of the disadvantages inherent in hand performed operations.

Accordingly it is a primary object of this invention to provide a new and improved machine for measuring, marking and cutting trouser legs preparatory to cuff making.

Another object of this invention is to provide a new and improved machine which is inexpensive in operation and is time saving.

Still another object of this invention is to provide a new and improved machine requiring a minimum of attention and a maximum of automatic operation.

Yet another object of this invention is to provide a new and improved machine which provides a maximum of safety for the operator.

A further object of this invention is to provide a new and improved machine which requires a minimum of servicing.

Still a further object of the invention is to provide a new and improved machine for accurately performing measuring, marking and cutting operations.

The foregoing is attained as well as other objects by providing a trouser processing machine having a work surface which may be augmented by a sliding member associated with an indexing device. The slidable body augmenting the length of work surface is set according to the indexing device for the length to which a pair of trousers is to be cut.

The pair of trousers to be processed is then placed on the work surface. The slidable member has associated with it a hinged member which may be lowered to clamp a trouser leg, and concurrently cut it to length and mark it with chalk lines for indicating where the material is to be folded in the cuff making process.

Figure 2:
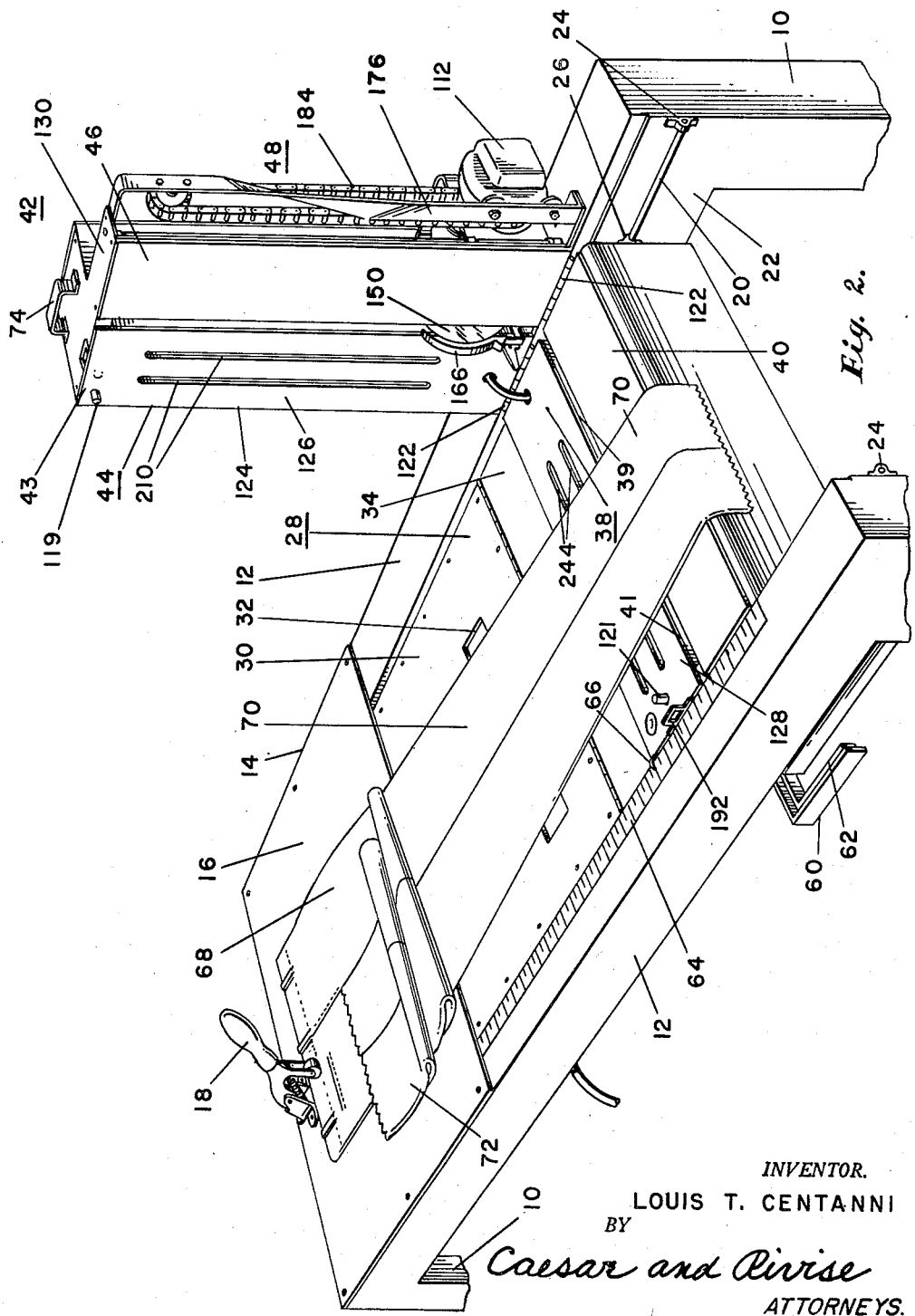
Figure 3:
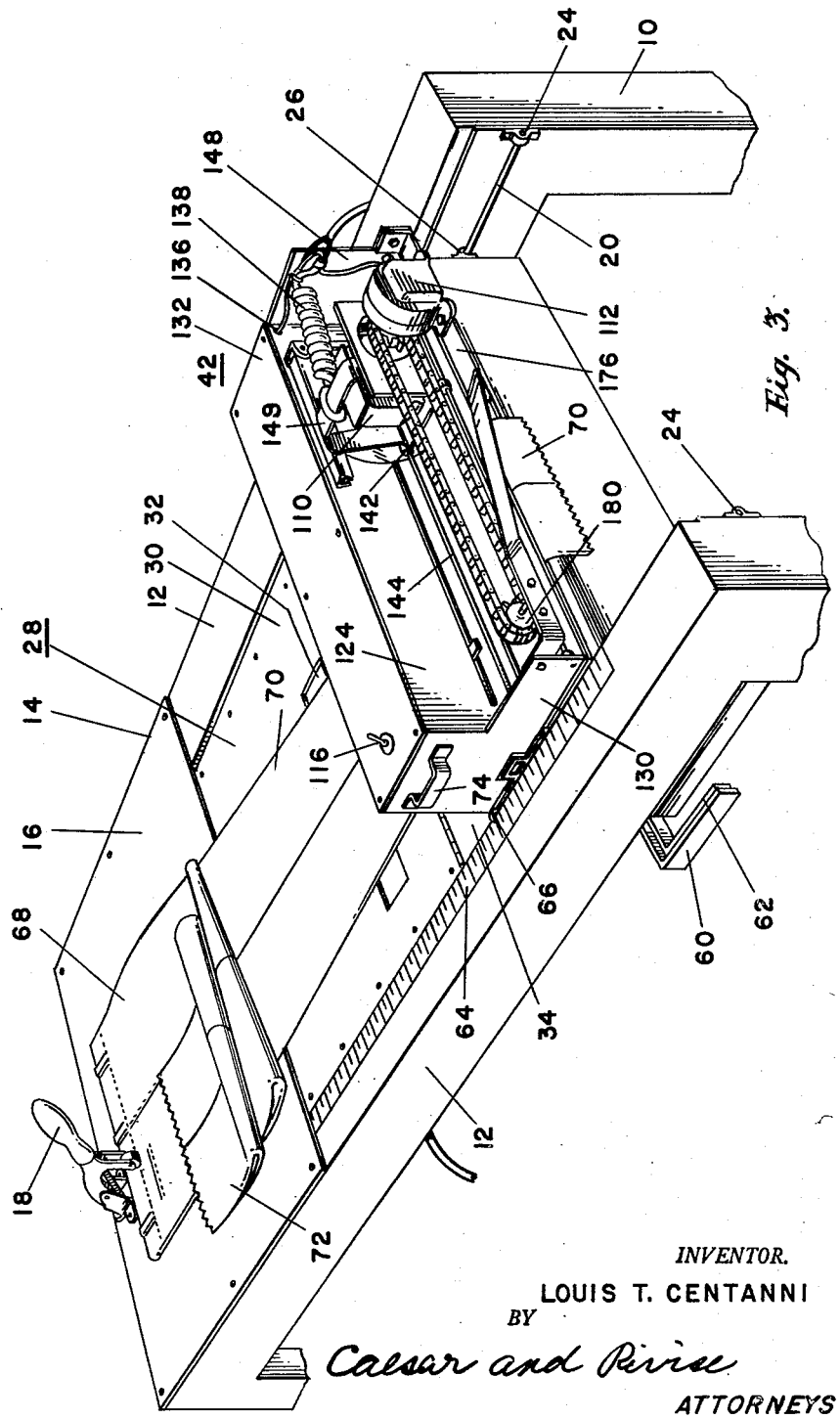
Figure 4:
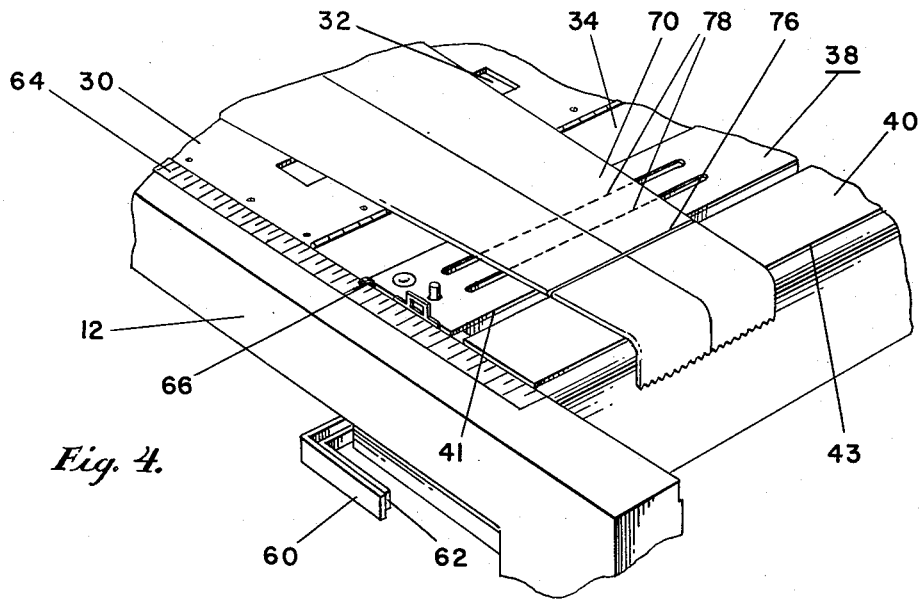
Figure 5:
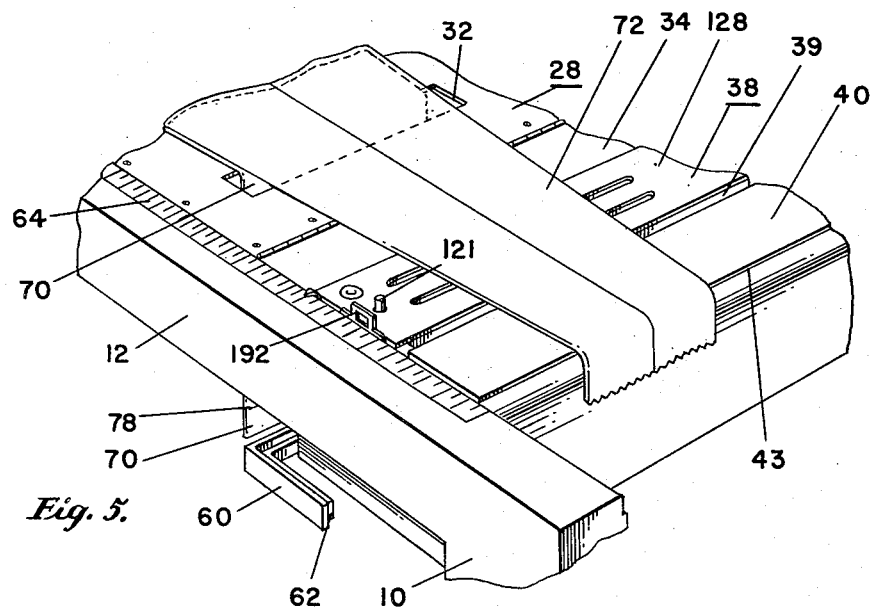

The above objects of the invention as well as many other objects will become apparent when the following description of the invention is read together with the drawings in which:

Figure 1 is a perspective view of the trouser processing machine embodying the invention, Figure 2 is an enlarged perspective view of the trouser processing machine showing a pair of trousers placed thereon prior to operating upon the left leg thereof, Figure 3 is a perspective view of the machine with the hinged member placed in its closed position for operation upon the left leg of a pair of trousers, Figure 4 is a fragmentary enlarged view of the machine with the hinged member in its open position following an operation upon the left leg of a pair of trousers, Figure 5 is a fragmentary view of the machine showing the left leg of a pair of trousers which has been operated upon received through an aperture while the right leg is positioned for processing.

Figure 6 is a fragmentary view showing the positioning and locking means associated with the slidable member of the machine.

Figure 8:
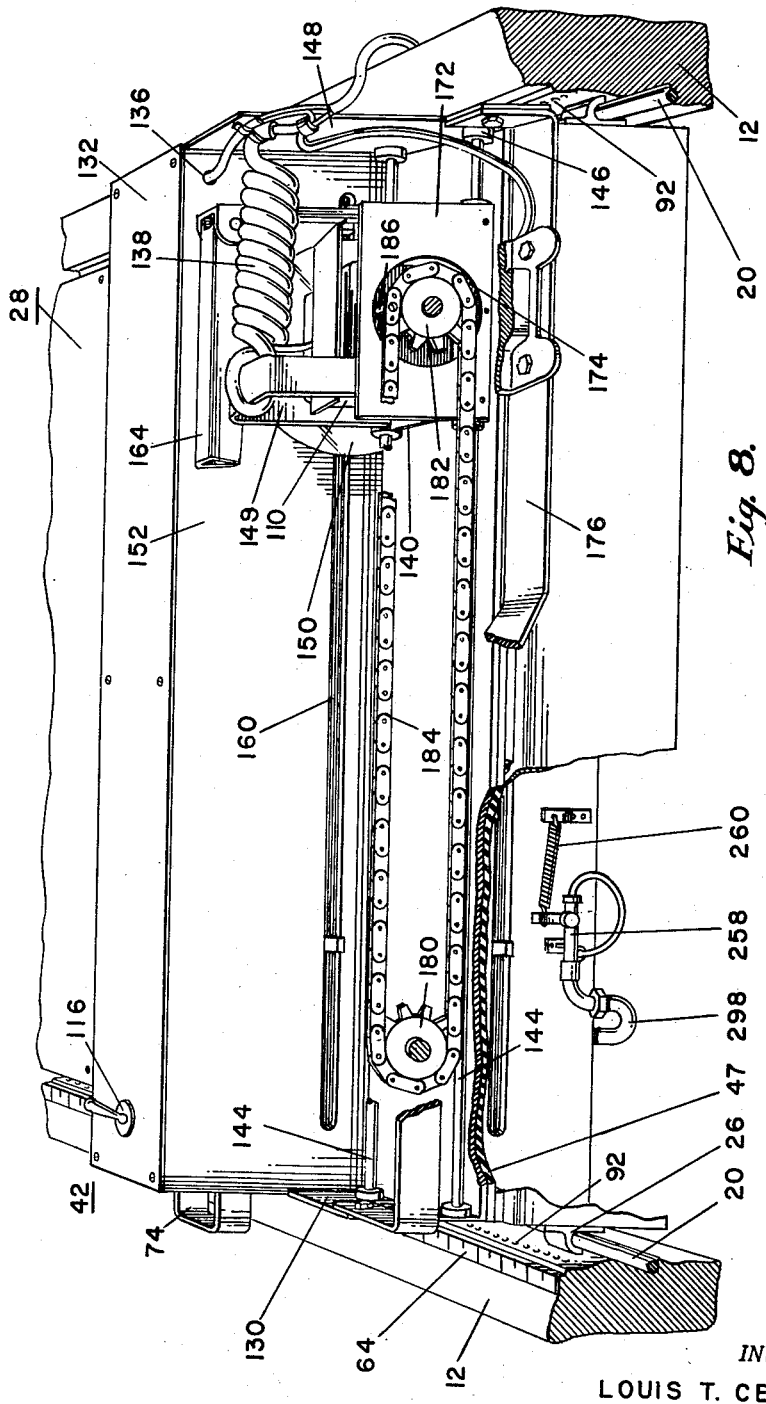
Figure 9:
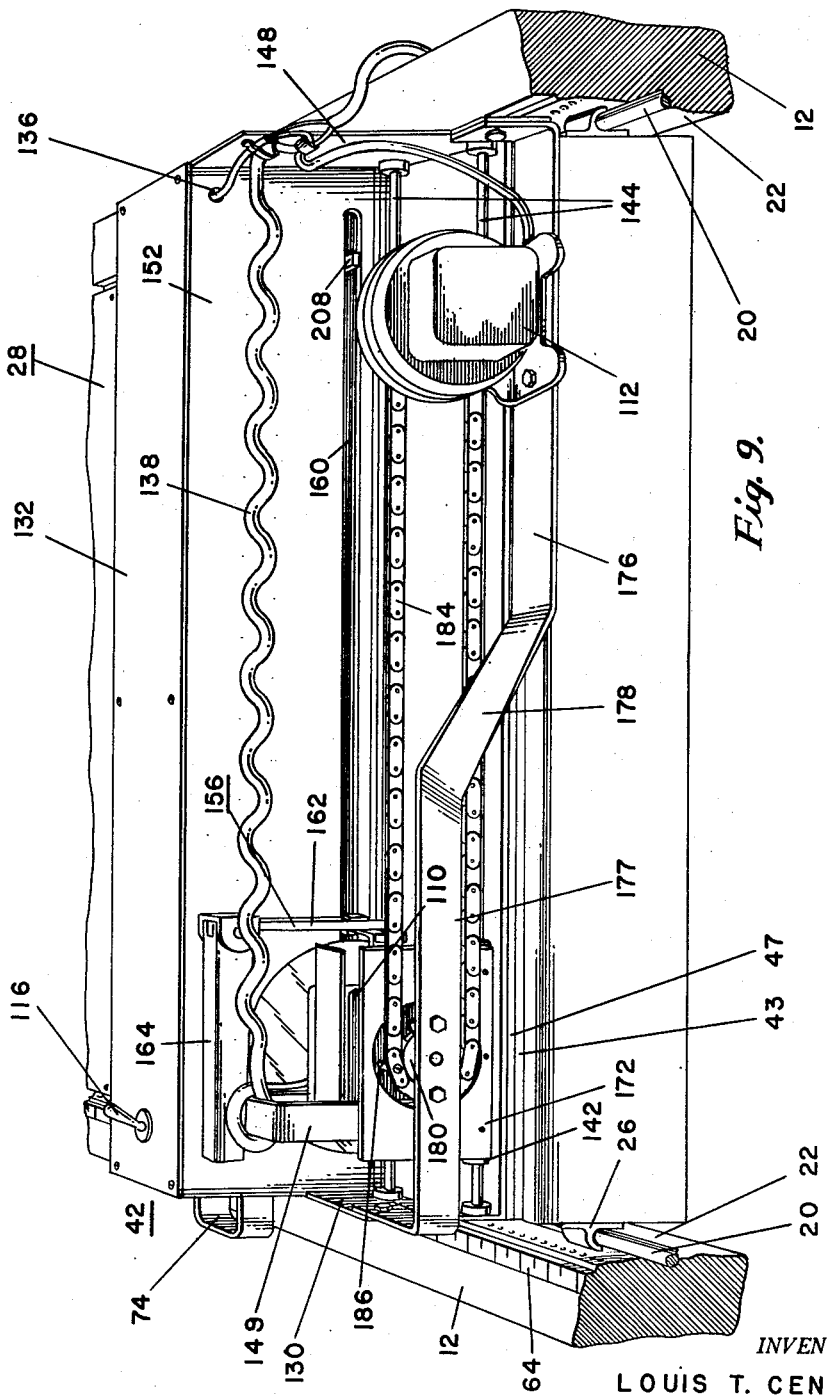

Figure 7 is a schematic diagram of the electrical circuit including the cutting disk motor and the carriage driving motor, Figure 8 is an end view of the machine with sections broken away showing the disk motor carriage in its first terminal position, Figure 9 is an end view of the machine with sections broken away showing the disk motor carriage in its second terminal position, Figure 10 is a fragmentary perspective view with sections broken away taken at an angle to show the locking means within the upper powder distributing housing as well as the disk motor carriage structure and lock actuating means associated therewith, Figure 11 shows in perspective the upper powder distributing assembly within its housing which is broken away, Figure 12 shows the lower powder distributing assembly with its distributing housing assembly broken away, Figure 13 is a fragmentary cross sectional view through the top and bottom distributor assemblies when positioned adjacent to each other with the hinged member in the closed position, Figure 14 is a view with parts broken away showing the right side walls of the upper and lower powder distributing assembly housings when adjacently positioned, for showing the actuation of the powder distributing apparatus and the hinged member locking means with the motivation of the disk motor carriage, Figure 15 is an enlarged view of the lower part of Figure 14 with portions broken away to show in greater detail the powder feed and distributing apparatus.

Figure 16 is an enlarged view of the air valve actuating finger shown in Figure 14, Figure 17 is an enlarged broken away view of the end of the powder feed tube.

Like reference numerals designate like parts throughout the several views.

Refer to Figure 1 which shows an overall view of the trouser processing machine. The machine frame structure comprises four legs 10 braced by cross members 11 and connected to a pair of side members 12. A plate 14 providing a work surface 16 is attached to a portion of the upper surface of the side members 12.

A trouser positioning and retaining element 18 is connected to the work surface 16 of the plate 14, and is shown in its release position.

A pair of guide rods 20 extending the length of the side members 12 are positioned respectively along the inside vertical surfaces 22 of the side members 12, each being attached thereto at its ends by means of respective pairs of securing brackets 24 (see Figure 2). A plurality of supporting brackets 26 engage the guide rods 20 for slidably supporting a carriage or slidable member 28 for controllably augmenting the work surface 16.

The slidable carriage 28 is comprised of a plate 30 provided with an opening 32, a door 34 hinged at one edge to allow servicing of a powder feeding apparatus 36 located under it, a lower powder distributing and marking assembly 38, and a lower clamping plate 40. The assembly 38 and the clamping plate 40 are spaced to form a cutting slit 39 between them.

A hinged assembly 42, including an upper powder distributing and marking apparatus 44, an upper clamping plate 46 and trouser cutting apparatus 48, is attached to the slidable carriage 28.

The working surfaces of the powder distributing and marking assemblies 38, 44 may be respectively lined with rubber like sheets 41 and 45. Likewise the clamping surfaces of the plates 40, 46 may be covered respectively by rubber like sheets 43 and 47 (see Figures 2 and 13).

An air compressing apparatus 50 which supplies air under pressure to the powder distributing apparatus 36, comprises an electric motor 52 which drives a compressor 54 which in turn delivers air under pressure through the condenser unit 56 to the storage tank 58.

Refer to Figures 1 to 5 in connection with the following description of the steps performed by the operator of the machine during the processing of a pair of trousers.

The length of the work surface of the machine is adjusted for the length a pair of trousers is to be cut, by squeezing together levers 60, 62. This allows the carriage 28 to slide on the guide rods 20. As the carriage 28 is slid to the left the plate 30 passes under the plate 14 reducing the length of the total work surface and the length to which the trousers will be cut. An index scale 64 on the inner top edge of one of the side members 12 is read by means of a pointer 66 attached to the movable carriage 28. The reading of the scale 64 indicates the length to which the trouser legs will be cut by the operation of the machine. The levers 60 and 62 are released to fix the slidable carriage 28 in the desired position.

Figure 2 shows a pair of trousers 68 placed on the work surface of the machine with the trouser top fixed in position by the securing element 18 while the left leg is extended over the work surface of the carriage 28, and the right leg 72 is folded back out of the way.

The hinged member 42 which is shown in its open position in Figure 2 is now lowered to its closed position by means of the handle 74 shown in Figure 3. When the hinged member 42 is lowered to its closed position it is locked in this position and the cutting apparatus 48 and the powder marking apparatus 38 and 44 are automatically actuated and perform their respective operations which will be described later in fuller detail.

After the cutting and marking operations have been completed the hinged member 42 is automatically unlocked and returned to its open position which it normally retains when not in operation.

Figure 4 shows a trouser leg 70 after the cutting and marking operation. The trouser leg 70 is cut along the line 76 and is marked by the pair of lines 78 on both sides thereof.

Figure 5 shows the positioning of the right trouser leg 72 prior to the cutting and marking operation. It is noted that the left trouser leg 70 may at this time be passed through the opening 32 provided therefor so that it will be out of the way.

The cutting and marking operation may now be performed on the right trouser leg 72 by lowering the hinged member 42 to its closed position as shown in Figure 3.

With the completion of the cutting and marking operation the hinged member 42 is again automatically unlocked and returned to its normal open position, at which time the pair of trousers 68 may be removed from the apparatus.

The pair of trousers 68 have now been cut to a desired length and marked for purposes of preparing cuffs therefor.

Figure 6 shows in detail the locking device associated with the carriage 28 for positioning it according to the length which a pair of trousers is to be cut. A stationary gripping handle or lever 60 is formed from a strip of metal 80 which has a right angle bend allowing its end 82 to be fastened to the left vertical wall 84 of the housing 86 for the lower powder distributing apparatus 38.

A movable handle or lever 62 which lies behind the handle 60 is connected to a locking rod 88 which is positioned and guided by brackets 90 connected along the wall 84.

The side member 12 has a plurality of openings 92 capable of receiving the end 94 of the locking rod 88. The spring 96 urges the end 94 of the rod 88 into one of the openings 92.

A linking member 98 which is pivoted about a central point 100 has one of its ends connected at the point 102 to the rod 88 while its other end is connected to the end of a locking rod 104. The end 106 of the locking rod 104 is also adapted to engage the openings 92 in the inside surface of its associated side member 12.

When the handles 60, 62 are brought together overcoming the force of the spring 96 the end of the rod 94 is withdrawn from one of the holes 92. The transmitted motion to rod 104 through the linking member 98 causes its end 106 to be likewise withdrawn from its associated opening 92 of the side member 12.

The carriage 28 can now be slid along the guide rods 20 to a desired position. The subsequent release of handles 60, 62 allows the ends 94, 106 of the respective rods 88, 104 to engage the openings 92 adjacent thereto fixing the carriage 28 with respect to the side members 12.

Figure 7 shows schematically the electrical circuit associated with the cutting apparatus 48 of the hinged member 42.

The terminals 108 may be connected to a power source of 110 volts alternating current. A cutting motor 110 and a carriage motor 112 may be connected in parallel each having one of its terminals connected to one of the terminals 108. The second of the terminals of motors 110 and 112 may be connected to the armature 114 of a toggle type safety switch 116. One of the terminals 118 of the saefty switch 116 which is contacted by the armature 114 in the "on" position is connected to one of the two terminals of a normally "off" push button switch 120. The other terminal of switch 120 is connected to the remaining power terminal 108.

Power is not delivered to the parallel connected motors 110, 112 unless the safety switch 116 is in its "on" position and the push button 119 of safety switch 120 (see Figure 2) is depressed closing the circuit. The motors 110, 112 can be turned off at any time by placing the safety switch 116 in its "off" position.

The push button 119 of safety switch 120 is automatically depressed closing the circuit when the hinged member 42 is placed in its closed position. The motors 110, 112 are deenergized when the switch 120 is released upon the unlocking of the hinged member 42 and its movement toward its open position at the end of a cutting and marking operation.

A spring loaded button 121 (see Figure 2) is also depressed when the member 42 is in its closed position and serves to assure the rapid opening of the member 42 as soon as it is released. This also assures the rapid opening of the switch 120 by the release of its button 119.

Referring to Figure 2 it is noted that the member 42 is connected to the carriage 28 by means of hinges 122 which are spring loaded to urge the member 42 towards its open position therein shown.

The housing 124 of the powder distributing apparatus 44 is a box like structure having an operating surface 126 oppositely positioned to the operating surface 128 of the lower powder distributing housing 86.

The clamping plate 46 has one of its ends connected to the hinge 122 while its other end is joined to the extended wall portion 130 of the housing 124.

Referring to Figure 3 the housing 124 is provided with a cover plate 132 fastened to the top thereof which retains the safety switch 116. Figure 10 shows a pair of electrical conductors within the housing 124 of which the ends 134 connect to the safety switch 116. The switch 120 is also shown series connected to the switch 116. The pair of conductors pass out of the housing 124 through the opening 136. One of the conductors is joined to the parallel connected motors 110 and 112 and then returned with the other conductor to the power supply.

Power is actually delivered to the motor 110 which is supported by a movable carriage 140 by means of a pair of conductors which pass through a spiraled conduit (Figure 3) 138 which expands and contracts with the mtion of the cutting disk motor 110.

The carriage 140 is provided with a plurality of bushings 142 which receive a pair of parallel guide rods 144. The guide rods 144 have their ends respectively connected by means of end brackets 146 to the wall 130 and a wall 148. Wall 148 is also an extension of the housing 124.

The carriage 140 has connected to it an inverted U-shaped strip 149 to which the extending end of the spiraled conduit 138 is attached.

The motor 110 is connected to and rotates a cutting disk 150. The motion of the carriage 140 carries the cutting disk 150 parallel to the right side wall 152 of the housing 124. A portion of the cutting disk 150 extends through a slit 154 formed between the wall 152 and the upper clamping plate 46 (see Figures 2 and 10).

A flange 153 of the carriage 140 has attached to it a bracket 155 which supports a cutting disk guard structure 156 and a member 158 which extends into a slit 160 in the wall 152 (see Figures 10 and 14).

The guard structure 156 comprises a vertical strip 162 with the hinged horizontal member 164 connected at its top, and an upwardly curved element 166 connected to its bottom.

The horizontal hinged element 164 can be swung upwardly for the purpose of allowing the removal of the cutting disk 150. The curved element 166 affords protection when the hinged member 42 is in its open position as seen in Figure 2.

As seen in Figure 14 the guard assembly 156 does not interfere with the cutting action of the wheel 150 which takes place on line 168 through the material which is positioned between the surfaces 126 and 128 of the housings 124 and 86 (see Figure 2).

A flange 170 of the carriage 140 has connected to it a vertical panel 172 provided with a circular opening 174. The position of the carriage 140 along the guide rods 144 is determined by means of the carriage driving apparatus associated with motor 112 acting upon the panel 172 which will now be described in detail.

Referring to Figures 8 and 9 the motor 112 is supported by a strip 176 which has its ends respectively connected to the extended walls 130 and 148 of the housing 124. The end 177 of the strip 176 which connects to the wall 130 is vertically orientated while the intermediate portion 178 is twisted so that the end adjacent the wall member 148 lies in a horizontal plane and supports the motor 112 thereon.

The portion 177 of the strip 176 has rotatably connected thereto a sprocket wheel 180. The motor 112 is connected to and drives a second sprocket wheel 182. A sprocket chain 184 links sprocket wheels 180 and 182. An extending element or finger 186 is connected to the sprocket chain 184 and extends into the opening 174 in the vertical panel 172 connected to the carriage 140.

Figure 8 shows the carriage 140 in its first terminal position, which is the position it assumes at the end of a cutting and marking operation and prior to the initiation of the next operation. When the hinged member 42 is placed in its closed position as shown in Figure 8 with the safety switch 120 in the "on" position and the depressible button 119 of switch 120 actuated, power is applied to motor 110 actuating the cutting disk 150, and the motor 112. The motor 112 rotates the sprocket wheel 182 in clockwise direction causing the sprocket chain 184 to move in a like direction. The portion of the chain 184 carrying the extending member 186 moves around the wheel 182 and comes off at a tangent causing the member 186 to engage the vertical panel 172 at a point on its opening 174 applying a force thereon parallel to the guide rods 144. This causes the carriage 140 to move along with the member 186 towards the sprocket wheel 180.

Figure 9 shows the carriage 140 in its second terminal position which is the extreme position reached when the extending member 186 passes around the sprocket wheel 180. When the extending member 186 comes off at a tangent to the sprocket wheel 180 it again engages the vertical panel member 172 causing the carriage 140 to move back towards its first terminal position.

When the carriage 140 reaches the first terminal position the hinged member 42 which has been locked in its closed position is released allowing the member 42 to return to its open position and thereby also opening the push button switch 120 cutting off power to the motors 110 and 112. The carriage 140 is now again in its first terminal position ready to begin another cutting operation when the hinged member 42 is brought down into its closed position and locked therein.

The locking mechanism which maintains the hinged member 42 in its closed position during a cutting and marking operation and which is automatically released when the carriage 140 returns to its first terminal position after the completion of such an operation will now be described in detail with reference to Figure 10.

Figure 10 shows the hinged member 42 locked in its closed position by a lock 188 which is located within the housing 124. The lock 188 has a tongue 190 which extends through a bracket 192. The bracket 192 is attached to the lower housing 86. The tongue 190 is normally extended for engagement with the bracket 192. The tongue 190 can be withdrawn for unlocking by means of an arm 194 which is moved outwardly from the lock 188. The spring 196 urges the arm 194 towards the locked position. The arm 194 is joined by a link 198 to the extending rod 200 which has its other end attached to the loop 202 of a lever 204 having one end pivotly connected to the bracket 206, while its other end 208 extends through the slot 160 in the wall 152.

When the carriage 140 returns to its first terminal position the extending arm 158 which is joined to the carriage 140 displaces to the right the end 208 of the lever 204. This results in the actuation of the arm 194 to disengage the tongue 190 from the bracket 192 unlocking the hinge member 42 and allowing it to return to its open position.

When the next cutting and marking operation is to be performed the hinged member 42 is again brought down to its closed position the button of switch 120 is depressed and power is delivered to the motors 110 and 112. The motor 112 moves the carriage 140 towards its second terminal position disengaging the lever 204 and allowing the lock 188 to extend its tongue 190 locking the hinged member 42 in its closed position.

The hinged member 42 remains in its closed position until the carriage returns to its first terminal position again releasing the lock 188 at which time the hinged member moves upwardly opening the switch 120 cutting off power to the motors 110 and 112.

Refer now to Figures 10, 11, 12 and 13 for description of powder distributing apparatus contained within the housings 86 and 124.

Figure 10 shows a pair of parallel slits 210 in the bottom wall 126 of the housing 124. These slits each receive an inverted U-shaped distributor bar 212 (Figure 11) slidable in the slits 210. The distributor bars 212 each have a groove 214 communicating outside of the housing 124 through the slits 210. The side walls of the slits 210 may be tapered to provide a good sliding fit for the distributor rods 212 (see Figure 13).

The rods 212 are joined at their ends by cross braces 216 and 218. The ends 220 of the cross brace 216 are positioned between the brackets 222 for restricting the motion of the cross brace 216 and rods 212 along their slits 210. The ends of the cross brace 218 are similarly retained by brackets 224.

Each of the rods 212 has connected at its top a plurality of distributor tubes 226 at uniform intervals along its length. The ends of the tubes 226 communicate with the grooves 214 of the rods 212. The other ends of the distributor tubes 226 from respective rods 212 are joined by corresponding intermediate tubes 228 to a main powder distributing tube 230 which passes out of the housing 124 through an opening 232 in the wall 126. The tube 230 then passes into the housing 86 through an opening 234 in the wall 128 and out of the lower distributing housing 86 through an opening 236 in the cover plate 238 of the lower housing 86.

A spring 240 has one end connected to the housing 124 while its other end is joined to the distributor rods 212 urging them towards their extreme right position.

A distributor actuating rod 242 is connected to the distributor lines 226 and has an extended end passing through the slit 160 of the right side wall 152 of the upper housing 124.

The lower powder distributing assembly 38 within the housing 86 is identical to that of the assembly within housing 124 except that it is inverted, the parallel slits 244 (see Figure 6) being positioned opposite the respective slits 210 in the housing 124.

The lower powder distributing assembly 38 also has an actuating rod 246 which extends through a groove 248 in the right side wall of the housing 86. A main powder distributing line 250 for the lower powder distributor assembly 38 also passes out of the housing 86 through the opening 236 in the cover plate 238.

Referring to Figure 14 it will be noted that as the carriage 140 moves towards the left the extending member 158 will contact the distributor actuating rod 242 and move it to the left. At the same time the lower distributor actuating rod 246 is contacted and moved to the left by the extended portion 252 of the curved guard element 166.

Concurrent with the actuation of the rods 242 and 246 a valve actuating finger 254 attached to the lower portion of the guard assembly 156 actuates the lever 256 of an air control valve 258. This allows delivery of powder to the distributor assemblies during the period when they are being moved to the left. The motion of the distributor assemblies while powder is being delivered allows more even distribution of the powder tending to mark a continuous line instead of dots on the trouser leg being processed.

As the finger is carried to the left with the motion of the carriage 140 towards its second terminal position, the lever 256 of the valve 258 is disengaged therefrom resulting in its return to the closed position urged by a spring 260.

Referring to Figure 16 it may be observed that the finger 254 is hinged allowing it to pass back over the lever 256 which is in its closed position. The finger 254 is returned to its normal vertical position by a spring 262 attached thereto.

The finger 254 is thus also able to pass over a quadrant wheel 262 associated with powder feeding means, without actuating same when moving towards its first terminal position. However, when the finger 254 moves from its first terminal position to its second terminal position, it engages the quadrant wheel 262 and revolves it one quarter of a revolution (see Figure 15). The counterclockwise motion imparted to the wheel 262 is delivered by a coupling rod 264 to a bevel gear 266. The bevel gear 266 engages a driven gear 268 supported by a frame 270 which in turn drives a spiral powder feed screw 272. The screw 272 is contained within a powder delivery tube 274.

The coupling rod 264 is supported by and passes through apertures in the left and right side walls of the lower housing 86. The frame 270 and powder delivery tube 274 are supported by brackets 276 which are attached to the left side wall 84 of the lower housing 86. The powder delivery tube 274 is connected to a powder supply reservoir 278 which has a removable filler cap 280 and contains marking powder 282 for delivery to the screw 272.

Figure 10 shows the door 34 partially open exposing the removable top 280 of the powder reservoir 278. The reservoir 278 is thus accessible for refilling.

The delivery end 284 of the tube 274 extends into a powder pick up tank 286, which is supported by a bracket 287 attached to the housing 86 (see Figure 6).

Refer to Figure 17 for an enlarged detailed drawing of the end 284 of tube 274. The tube is cut off at an angle so that the upper portion of the end 284 of the tube 274 extends out beyond the lower portion 290. The end 284 of the tube 274 is enclosed by a cover 292 hinged at the upper portion 288 of the tube so that it is urged towards its closed position as shown. The powder feed screw 272 is terminated at an angle conforming with the end 284 of the tube 274 so that it is provided with an extending portion 294. When the powder feed screw 272 is rotated 180° its position will be that indicated by the dashed lines extending beyond the lower portion 290 of the tube 274 and causing the cover 292 to swing outwardly opening the end of the tube 274 and allowing delivery of powder into the chamber of the powder pick up tank 286.

When the powder feed screw 272 is rotated another 180° it returns to its original position with the cover 292 in its closed position.

The conversion ratio of the gears 266 and 268 is such that one quarter revolution of the quadrant wheel 262 causes a full 360° revolution of the feed screw 272. Thus with each actuation of the wheel 262 by the finger 254 in its motion towards its second terminal position a measured quantity of powder is delivered by the screw 272 from the reservoir 278 to the powder pick up tank 286.

The output port of the air valve 258 connects with chamber of the powder pick up tank 286 by means of a tube 296, while its input port is connected to the compressed air tank 58 (Figure 1) by means of a line 298. Thus air under pressure is delivered to the powder pick up tank 286 when the valve 258 is actuated by the finger 256. It is noted that because the quadrant wheel 262 is actuated before the opening of valve 258, powder is delivered to the tank 286 well before air under pressure is delivered thereto. Thus when air under pressure is delivered to the tank 286 powder has already been supplied and the cover 292 on the end 284 of the tube 274 is closed preventing air passage therethrough. The two main powder delivery tubes 230 and 250 are connected with the chamber of the powder pick up tube 286 for respectively delivering powder to the upper and lower powder distributing assemblies 38 and 44.

Briefly summarizing the overall opration of the machine, the handles 60, 62 are brought together to allow the carriage 28 to be positioned according to the length which a pair of trousers are to be cut, this length being indicated by the pointer 66 and scale 64 reading the length as measured from the top of the trousers along the outside seam. The handles 60, 62 are releasd to lock the carriage 28 in the position desired. The trousers 68 are placed on the work surface of the machine with the top retained by the positioning device 18 and one of the trouser legs being extended to pass over the operating surface 128 of the housing 86 and the clamping plate 40.

The hinged member 42 is swung down to its closed position depressing the button 119 of the switch 120 resulting in the delivery of power to the motors 110 and 112.

The carriage 140 is driven towards its second terminal position releasing the lever 204 resulting in the locking of the hinged member 42 in its closed position.

After the carriage 140 moves a short distance from its first terminal position towards its second terminal position the finger 254 associated with the guard assembly engages the quadrant wheel 262 resulting in the delivery of a predetermined quantity of powder into the chamber of the powder pick up tank 286.

As the carriage 140 moves further along towards its second terminal position the cutting disk 150 which is rotated by the motor 110 and extends into the slit 39 cuts the trouser leg to the set length.

Just before the carriage 140 reaches its second terminal position the distributor actuating rods 242 and 246 are actuated respectively motivating the upper and lower powder distributor assemblies concurrently with the opening of the air valve 258. This results in marking two parallel lines on both sides of the trouser leg then being processed. As the carriage 140 moves further the air valve 258 is released to assume its closed position. The carriage 140 passes through its second terminal position and proceeds back towards its first terminal position.

Upon approaching its first terminal position the carriage 140 by means of the extended member 159 actuates the lever 204 resulting in the release of the lock 188 causing the hinged member 42 to resume its open position, thus releasing the push button switch 120 opening the electrical circuit of the motors 110 and 112. The apparatus is now in position to start a new cutting and marking operation.

While this invention has been described and illustrated with reference to a specific embodiment, it is to be understood that the invention is capable of various modifications and applications, not departing essentially from the spirit thereof, which will become apparent to those skilled in the art.

What is claimed is:

1. In combination, a revolvable cutting disk, a first controlled motive means connected with said cutting disk, a movable structure carrying said disk and said motive means in a predetermined direction, a second controlled motive means moving said structure from a first terminal position to a second terminal position and from its second terminal position to its first terminal position, and a control unit energizing said first and second motive means, said first and second motive means being de-energized upon the motion of said structure from its second terminal position to its first terminal position.

2. In a trouser processing machine, a body having a stationary work surface, a member slidable within said body beneath said stationary work surface and controllably augmenting the length of said work surface, a unit positionable over and hinged to said slidable member, a trouser leg cutting and clamping means supported by said unit, and a means carried by said member and said unit and operatively connected to said cutting means for depositing a powdered marking material on both sides of a trouser leg.

3. In a trouser processing machine, a body having a work surface, a member hinged with said body having a closed and an open position, said member being in its closed position when it is proximate with the work surface of said body, means urging said member towards its open position, a locking device for maintaining said member in its closed position, a revolvable cutting disk carried by said member, a first controlled motive means connected with said cutting disk, a second controlled motive means moving said revolvable cutting disk alternately between first and second terminal positions, a unit controlling said first and second motive means actuated when said member is in its closed position, and means releasing said locking device after said disk returns from its second terminal position to its first terminal position.

4. In a trouser processing machine, a body having a work surface, a member hinged with said body having a closed and an open position, said member being in its closed position when it is proximate with the work surface of said body, means urging said member towards its open position, a locking device for maintaining said member in its closed position, a revolvable cutting disk carried by said member, a first controlled motive means connected with said cutting disk, a second controlled motive means moving said revolvable cutting disk alternately between first and second terminal positions, a unit controlling said first and second motive means actuated when said member is in its closed position, a device carried in part by said body and in part by said member for marking a trouser leg, chalk feeding means periodically connected with said marking device upon actuation by said cutting disk moving between its terminal positions, and means releasing said locking device after said disk returns from its second terminal position to its first terminal position.

5. In a trouser processing machine, a body having a work surface, a member positionable over the work surface and hinged with said body, a revolvable cutting disk, motive means revolving said cutting disk, a structure movably supported within said member carrying said disk and said motive means, means moving said structure between first and second terminal positions, a powder distributing assembly having a plurality of outputs in linear formation within said body and said member, a powder supplying unit, valved connecting means joining said powder supplying unit and said powder distributing assembly, and an element connected to said movable structure controlling said valved connecting means by periodically opening same and concurrently moving said powder distributing assembly substantially in the direction of the linear formation of said outputs during predetermined positions of said movable structure.

6. In a feeding device; a feed screw member having a longitudinal axis and provided at its output end with an off-centered axially extending portion; a housing unit having a cylindrical chamber receiving said feed screw member and provided at its output end with an extending portion conforming with the extending portion of said feed screw member; and a cover element linked with the extending portion of said housing; said cover element enclosing the output end of said cylindrical chamber when said extending portions of said screw member and housing unit are proximately disposed, while uncovering same when said extending portions are displaced from said proximate disposition by the rotation of said screw member about its axis.

7. In a trouser processing machine, a table having a stationary work surface at one of its ends, a member slidable beneath said stationary work surface to controllably augment the length of said work surface, said slidable member including an opening of predetermined dimensions at a predetermined location and adapted to receive a trouser leg, and a cutting means carried by said slidable member.

8. In a trouser processing machine, a table having a stationary work surface at one of its ends, a member slidable beneath said stationary work surface to controllably augment the length of said work surface, said slidable member including an opening of predetermined dimensions at a predetermined location and adapted to receive a trouser leg, a cutting means carried by said slidable member, and a means carried by said slidable member and associated with said cutting means for depositing a marking material on the other trouser leg being processed.

9. In a trouser processing machine, a table having a stationary work surface at one of its ends, a member slidable beneath said stationary work surface to controllably augment the length of said work surface, said slidable member including an opening of predetermined dimensions at a predetermined location and adapted to receive a trouser leg, a cutting means carried by said slidable member, and a means carried by said slidable member and associated with said cutting means for depositing a marking material on both sides of the other trouser leg being processed.

10. In a trouser processing machine, a body including a table having a stationary work surface at one of its ends, a member slidable beneath said stationary work surface to controllably augment the length of said work surface, said slidable member including an opening of predetermined dimensions at a predetermined location and adapted to receive a trouser leg, cooperating index marks carried by said body and said slidable member to indicate their relative positions, a cutting means carried by said slidable member, and a means carried by said slidable member and coordinated with said cutting means for depositing a powdered marking material on the other trouser leg being processed.

11. In a trouser processing machine, a body having an elongated work surface, a member positionable transversely over said work surface, a structure reciprocable within said member, a powder distributing assembly having a plurality of outputs in linear formation within said body and said member, a powder supply unit, valved means interconnecting said powder supplying unit and said powder distributing assembly, and an element carried by said movable structure periodically opening said valved connecting means and concurrently moving said powder distributing assembly substantially in the direction of the linear formation of said outputs during predetermined positions of said movable structure.

12. The combination of claim 11 wherein said powder distributing assembly includes a pair of elongated bars of substantially inverted U-shape receiving a trouser leg between them, a plurality of tubes connected at spaced points along the length of said bars, a compressor, and a pick up tank operatively connected to said tubes, to said compressor and to said valved means for delivering a cloud of marking powder to said bars.

13. The combination of claim 11 wherein said powder distributing means includes a compressor and a pick up tank connected to said linear outputs and to said compressor, and said powder supplying unit includes a tube terminating at one of its ends in the interior of said pick up tank, a screw conveyor rotatable in said tube, a powder-containing hopper communicative with said tube, a quadrant wheel rotatably mounted on said member and gear means connecting said quadrant wheel with the other end of said screw conveyor, said element carried by said movable structure being adapted to engage said quadrant wheel and turn said screw conveyor periodically upon movement of said movable structure a predetermined distance.

14. The combination of claim 13 wherein the end of said tube within said pick up tank is cut off at an angle to its longitudinal axis to provide an upper portion extending beyond a lower portion, the corresponding end of said screw conveyor being cut off at substantially the same angle, and a cover hinged to said upper portion and normally urged towards a closed position, whereby when the cut off ends of said conveyor and tube are substantially parallel the cover remains closed whereas rotation of said conveyor 180° will force said cover to open.

15. In a trouser processing machine, a body having an elongated work surface to receive a trouser leg thereon and means to deposit a marking material along a predetermined line of said trouser leg, said means including an elongated bar of substantially inverted U-shape opening along said predetermined line, a tank, means to deliver powder periodically to said tank, means to deliver air under pressure periodically to said tank at a predetermined time after delivery of powder and conduits connected at spaced intervals along the length of said bar and operatively connected to said tank.

16. In a trouser processing machine, a body having an elongated work surface to receive a trouser leg thereon and means to deposit a marking material along a predetermined line of said trouser leg, said means including a pair of elongated bars of substantially inverted U-shape opening opposite each other on both sides of said trouser leg at the predetermined line, a tank, means to deliver powder periodically to said tank, means to deliver air under pressure periodically to said tank at a predetermined time after delivery of powder and conduits connected at spaced intervals along the length of said bars and operatively connected to said tank.

References Cited in the file of this patent

UNITED STATES PATENTS

| Number | Name | Date |
|--------|------|------|
| 144,023 | Fluck | Oct. 28, 1873 |
| 209,995 | Walker | Nov. 19, 1878 |
| 357,583 | Daniels | Feb. 15, 1887 |
| 504,509 | Ziegler | Sept. 5, 1893 |
| 985,446 | Pease | Feb. 28, 1911 |
| 1,270,251 | Smith | June 18, 1918 |
| 1,363,296 | Wing | Dec. 28, 1920 |
| 1,404,318 | Price | Jan. 24, 1922 |
| 1,446,380 | De Laney | Feb. 20, 1923 |
| 1,529,340 | Buckingham | Mar. 10, 1925 |

(Other references on following page)

UNITED STATES PATENTS

| Number | Name | Date |
|---|---|---|
| 1,666,658 | Israel | Apr. 17, 1928 |
| 2,527,876 | Curtis | Oct. 31, 1950 |
| 2,574,269 | Lange | Nov. 6, 1951 |
| 2,598,227 | Constantine | May 27, 1952 |

FOREIGN PATENTS

| Number | Country | Date |
|---|---|---|
| 388,717 | France | Aug. 20, 1908 |
| 8,459 of 1912 | Great Britain | Apr. 9, 1912 |